(12) United States Patent
Dan

(10) Patent No.: US 7,622,214 B2
(45) Date of Patent: Nov. 24, 2009

(54) FUEL CELL CAPABLE OF PREVENTING ANODE OXIDATION

(75) Inventor: Koji Dan, Kawagoe (JP)

(73) Assignee: Honda Motor Co., Ltd., Tokyo (JP)

( * ) Notice: Subject to any disclaimer, the term of this patent is extended or adjusted under 35 U.S.C. 154(b) by 483 days.

(21) Appl. No.: 10/849,096

(22) Filed: May 18, 2004

(65) Prior Publication Data

US 2004/0234837 A1   Nov. 25, 2004

(30) Foreign Application Priority Data

May 19, 2003   (JP) .............................. 2003-139935

(51) Int. Cl.
*H01M 8/02* (2006.01)
*H01M 8/24* (2006.01)
*H01M 4/86* (2006.01)

(52) U.S. Cl. .............................. 429/38; 429/39; 429/40

(58) Field of Classification Search .............. 429/38–40
See application file for complete search history.

(56) References Cited

U.S. PATENT DOCUMENTS 4,910,100 A   3/1990   Nakanishi et al.
5,595,834 A * 1/1997   Wilson et al. ................. 429/30
6,344,290 B1* 2/2002   Bossel .......................... 429/38
6,361,892 B1   3/2002   Ruhl et al.
6,916,569 B2* 7/2005   Batawi et al. ................. 429/30

FOREIGN PATENT DOCUMENTS

EP   1209753 A1   5/2002
JP   2002-203579   7/2002

* cited by examiner

*Primary Examiner*—Mark Ruthkosky
*Assistant Examiner*—Karie O'Neill
(74) *Attorney, Agent, or Firm*—Lahive & Cockfield, LLP; Anthony A. Laurentano

(57) ABSTRACT

A fuel cell includes an electrolyte electrode assembly including a cathode, and an anode, and an electrolyte interposed between the cathode and the anode. The anode is made of porous material of Ni, for example. A dense layer is formed integrally on an outer circumferential surface of the anode as a protective layer by densifying process. The dense layer prevents an exhaust gas from flowing into the anode. The dense layer is formed by heating an outer circumferential region of the anode by a laser or the like.

6 Claims, 19 Drawing Sheets

← FUEL GAS

FUEL CELL CAPABLE OF PREVENTING ANODE OXIDATION

BACKGROUND OF THE INVENTION

1. Field of the Invention

The present invention relates to a fuel cell having an electrolyte electrode assembly including an anode, a cathode, and an electrolyte interposed between the anode and the cathode. The electrolyte electrode assembly is interposed between separators.

2. Description of the Related Art

Typically, a solid oxide fuel cell (SOFC) employs an electrolyte of ion-conductive solid oxide such as stabilized zirconia. The electrolyte is interposed between an anode and a cathode to form an electrolyte electrode assembly. The electrolyte electrode assembly is interposed between separators (bipolar plates), and the electrolyte electrode assembly and the separators make up a unit of fuel cell for generating electricity. A predetermined number of fuel cells are stacked together to form a fuel cell stack.

In the fuel cell, an oxygen-containing gas or air is supplied to the cathode. The oxygen in the oxygen-containing gas is ionized at the interface between the anode and the electrolyte, and the oxygen ions ($O^{2-}$) move toward the anode through the electrolyte. A fuel gas such as hydrogen-containing gas or CO is supplied to the anode. Oxygen ions react with the hydrogen in the hydrogen-containing gas to produce $H_2O$ or react with CO to produce $CO_2$. Electrons released in the reaction flow through an external circuit to the cathode, creating a DC electric current.

For example, Japanese laid-open patent publication No. 2002-203579 discloses a solid oxide fuel cell shown in FIG. 19. As shown FIG. 19, the solid oxide fuel cell is formed by stacking power generation cells 1 and separators 2 alternately. Each of the power generation cells 1 includes a fuel electrode layer 1b, an air electrode layer 1c, and a solid electrolyte layer 1a interposed between the fuel electrode layer 1b and the air electrode layer 1c. A porous conductive fuel electrode current collector 3 is provided on one surface of the power generation cell 1, and a porous conductive air electrode current collector 4 is provided on the other surface of the power generation cell 1. The fuel electrode current collector 3, the power generation cell 1, and the air electrode current collector 4 are sandwiched between a pair of separators 2.

The separator 2 has a fuel gas supply passage 5 and an air supply passage 6. The fuel gas supply passage 5 is connected to a fuel gas hole 5a formed at a substantially central region on one surface of the separator 2. The air supply passage 6 is connected to an air hole 6a formed at a substantially central region on the other surface of the separator 2. The fuel gas hole 5a faces the fuel electrode current collector 3. The air hole 6a faces the air electrode current collector 4.

The fuel gas such as $H_2$ or CO flows through the fuel gas supply passage 5, and is from the substantially central region of the separator 2 toward the center of the fuel electrode current collector 3. The fuel gas flows through holes formed in the fuel electrode current collector 3 toward the substantially central region of the fuel electrode layer 1b. Then, the fuel gas flows along unillustrated slits to move radially outwardly toward the outer region of the fuel electrode layer 1b.

Likewise, the air is supplied from the substantially central region of the separator 2 toward the center of the air electrode current collector 4. The air flows through holes formed in the air electrode current collector 4 toward the substantially central region of the air electrode layer 1c. Then, the air flows along unillustrated slits to move radially outwardly toward the outer region of the air electrode layer 1c. In this manner, in each of the power generation cells 1, the fuel gas is supplied to the surface of the fuel electrode layer 1b, and the air is supplied to the surface of the air electrode layer 1c to carry out power generation.

According to the disclosure of Japanese laid-open patent publication No. 2002-203579, the fuel gas flows outwardly from the substantially central region to the outer region of the fuel electrode layer 1b, and the air flows outwardly from the substantially central region to the outer region of the air electrode layer 1c. The unreacted fuel gas and air are mixed together to cause reaction around the outer region of the power generation cell 1. After the reaction, the remaining fuel gas and air are discharged as an exhaust gas. The amount of air supplied to the power generation cell 1 tends to be excessive in contrast to the amount of fuel gas supplied to the power generation cell 1. Therefore, substantial amount of oxygen is present in the exhaust gas. The outer region of the power generation cell is likely to be exposed to the oxygen.

The fuel electrode layer 1b is made of metal such as nickel (Ni). The metal (Ni) of the outer region of the fuel electrode layer 1b is oxidized undesirably into NiO by the exposure to the oxygen. Further, the exhaust gas containing the oxygen flows in the fuel electrode current collector 3, and reduction reaction of NiO is prevented. NiO has a high electrical resistance. Therefore, the effective surface area used for power generation is reduced by the presence of NiO. Consequently, the desired power generation performance (efficiency) of the power generation cell 1 can not be achieved.

SUMMARY OF THE INVENTION

A general object of the present invention is to provide a fuel cell having a simple structure in which an anode is not affected by oxygen in the exhaust gas, and the power generation efficiency is improved greatly.

According to the present invention, a fuel cell includes an electrolyte electrode assembly and a pair of separators sandwiching the electrolyte electrode assembly. The electrolyte electrode assembly includes an anode, a cathode, and an electrolyte interposed between the anode and the cathode. A fuel gas is supplied outwardly from a central region to an outer circumferential region of the anode for inducing reaction at the anode, and an oxygen-containing gas is supplied to the cathode for inducing reaction at the cathode. An exhaust gas including fuel gas and oxygen-containing gas after reaction is discharged outwardly from the electrolyte electrode assembly.

A protective layer for preventing the exhaust gas from flowing into the anode is formed integrally on the outer circumferential region of the anode. Thus, the exhaust gas containing oxygen does not flow into the anode from the outer circumferential region of the anode. Reduction reaction of the material of the anode (e.g., NiO) is not prevented by the oxygen in the exhaust gas. Therefore, NiO is reduced into Ni. The entire anode is used desirably. Large surface area of the electrolyte electrode assembly can be used for power generation, and thus, fuel utilization ratio is improved, and the desired power generation efficiency can be achieved.

The anode is made of porous material, and the protective layer may include a dense layer provided by densifying process on the outer circumferential surface on the anode. The dense layer is thin, and easily produced by heating the outer circumferential region of the anode by a laser or the like. The constituent material of the dense layer is same as the anode. Thus, the dense layer does not affect the power generation performance. The effective power generation surface area is not reduced by the presence of the dense layer. The fuel utilization ratio is maintained, and the desired power generation performance can be achieved.

The anode is made of porous material, and the protective layer may include a low porosity layer formed on the outer circumferential region of the anode. The low porosity layer has a porosity lower than a porosity of material inside the anode. The porosity inside the anode is high. Therefore, the fuel gas flows smoothly inside the anode. The low porosity layer covering the anode has the low porosity. Therefore, oxygen in the exhaust gas does not flow into the anode.

The anode is made of porous material, and the protective layer may include an electrolyte layer formed integrally on the anode to cover at least part of the surface of the outer circumferential region of the anode. In producing the electrolyte electrode assembly, the electrolyte is formed on the anode, and the cathode is formed on the electrolyte. At this time, the electrolyte is formed to include the electrolyte layer which covers the outer circumferential surface of the anode. Oxygen in the exhaust gas does not flow into the anode. Therefore, the effective surface area of the anode used for power generation is not reduced, and the desired power generation efficiency is maintained.

The anode is made of porous material, and a shield member is provided to cover at least part of the outer circumferential region of the anode for preventing the exhaust gas from flowing into the anode. The shield member is made of thermally insulating porous material such as ceramic fiber or ceramic wool, for example. Further, it is also preferable that the shield member is made of porous brick or a formed body of ceramic fiber or ceramic wool, having a low porosity. The undesirable entry of the exhaust gas is prevented simply by using the shield member. Therefore, the fuel cell has the simple structure, and can be produced at a low cost.

The separator includes first and second plates stacked together. A fuel gas channel and an oxygen-containing gas channel are formed between the first and second plates. A fuel gas flowing through the fuel gas channel is supplied to the anode one surface of the separator. An oxygen-containing gas flowing through the oxygen-containing gas channel is supplied to the cathode on the other surface of the separator. Thus, the separator has a compact structure, and the power generation can be carried out uniformly in each of the fuel cells.

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
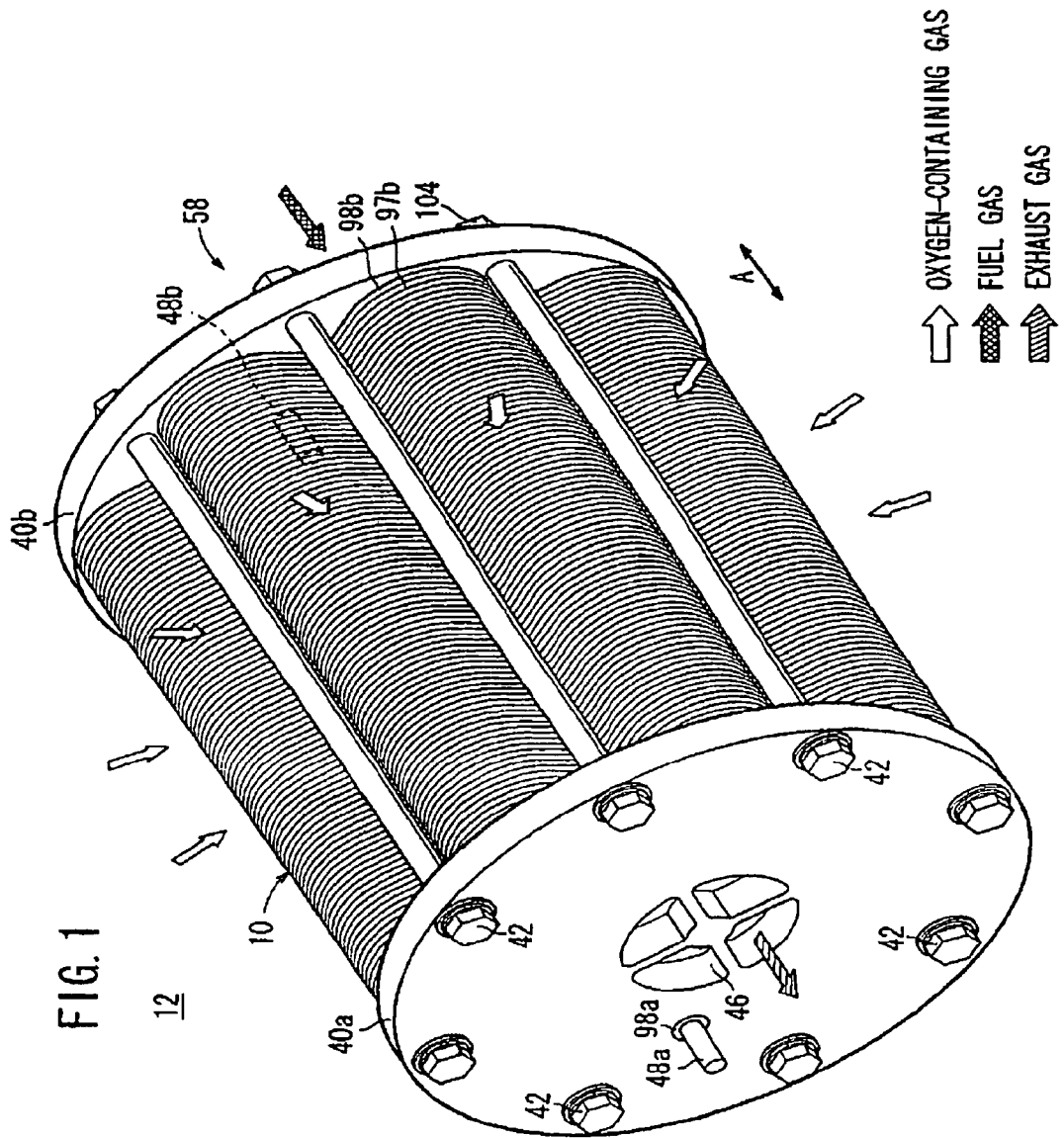
FIG. 1 is a perspective view schematically showing a fuel cell stack formed by stacking a plurality of fuel cells according to a first embodiment of the present invention.
Figure 2:
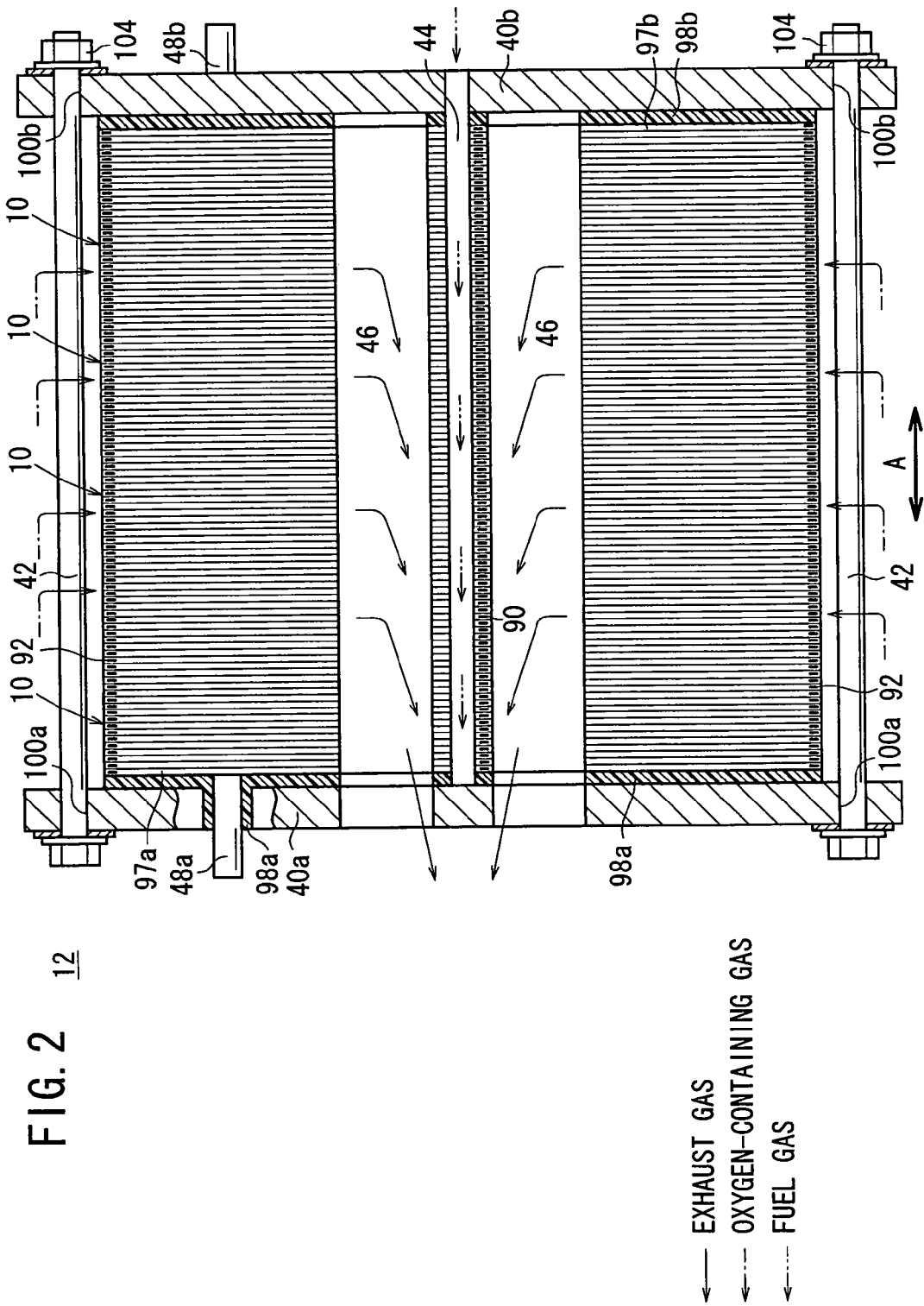
FIG. 2 is a cross sectional view showing part of the fuel cell stack.

FIG. 1 is a perspective view schematically showing a fuel cell stack 12 formed by stacking a plurality of fuel cells 10 according to a first embodiment of the present invention, and FIG. 2 is a cross sectional view showing part of the fuel cell stack 12.

The fuel cell 10 is a solid oxide fuel cell (SOFC) for stationary and mobile applications. For example, the fuel cell 10 is mounted on vehicles. In an example of the first embodiment shown in FIG. 3, the fuel cell stack 12 is used in a gas turbine 14.

A plurality of fuel cell stacks 12 are placed in the gas turbine 14. For example, eight fuel cell stacks 12 are provided around a combustor 18 at intervals of 45° in the casing 16. Each of the fuel cell stacks 12 is covered by a cover 19 attached to the casing 16. The fuel cell stack 12 discharges an exhaust gas as a mixed gas of a fuel gas and an oxygen-containing gas after reaction into a chamber 20 toward the combustor 18. The chamber 20 is narrowed in a flow direction of the exhaust gas indicated by an arrow X. A heat exchanger 22 is externally provided around the chamber 20 at a forward end in the flow direction. Further, a turbine (power turbine) 24 is disposed at the forward end of the chamber 20. A compressor 26 and a power generator 28 are coaxially connected to the turbine 24. The gas turbine 14 has an axially symmetrical structure as a whole.

A discharge passage 30 of the turbine 24 is connected to a first passage 32 of the heat exchanger 22. A supply passage 34 of the compressor 26 is connected to a second passage 36 of the heat exchanger 22. The air is supplied to the outer circumferential surfaces of the fuel cell stacks 12 through a hot air inlet passage 38 connected to the second passage 36.

As shown in FIG. 1, the fuel cell stack 12 is formed by stacking a plurality of fuel cells 10 in a stacking direction indicated by an arrow A. Each of the fuel cells 10 has a shape of a disk having a curved outer section. Flanges 40a, 40b are provided outside the outermost fuel cells 10 at opposite ends in the stacking direction, respectively. The fuel cells 10 and the flanges 40a, 40b are tightened together by a plurality of (e.g., eight) tightening bolts 42. As shown in FIG. 2, at the center of the fuel cell stack 12, a circular fuel gas supply hole 44 is formed for supplying the fuel gas to the fuel cell stack 12. The fuel gas supply hole 44 has a bottom at the flange 40a, and extends in the direction indicated by the arrow A.

A plurality of (e.g., four) discharge passages 46 are formed around the fuel gas supply hole 44. Each of the discharge passages 46 has a bottom at the flange 40b, and extends from the flange 40b in the direction indicated by the arrow A. The flanges 40a, 40b are insulated from end plates 97a, 97b by insulator plates 98a, 98b interposed between the flanges 40a, 40b, and the end plates 97a, 97b, respectively. Output terminals 48a, 48b, extend from the end plates 97a, 97b, respectively.

Figure 4:
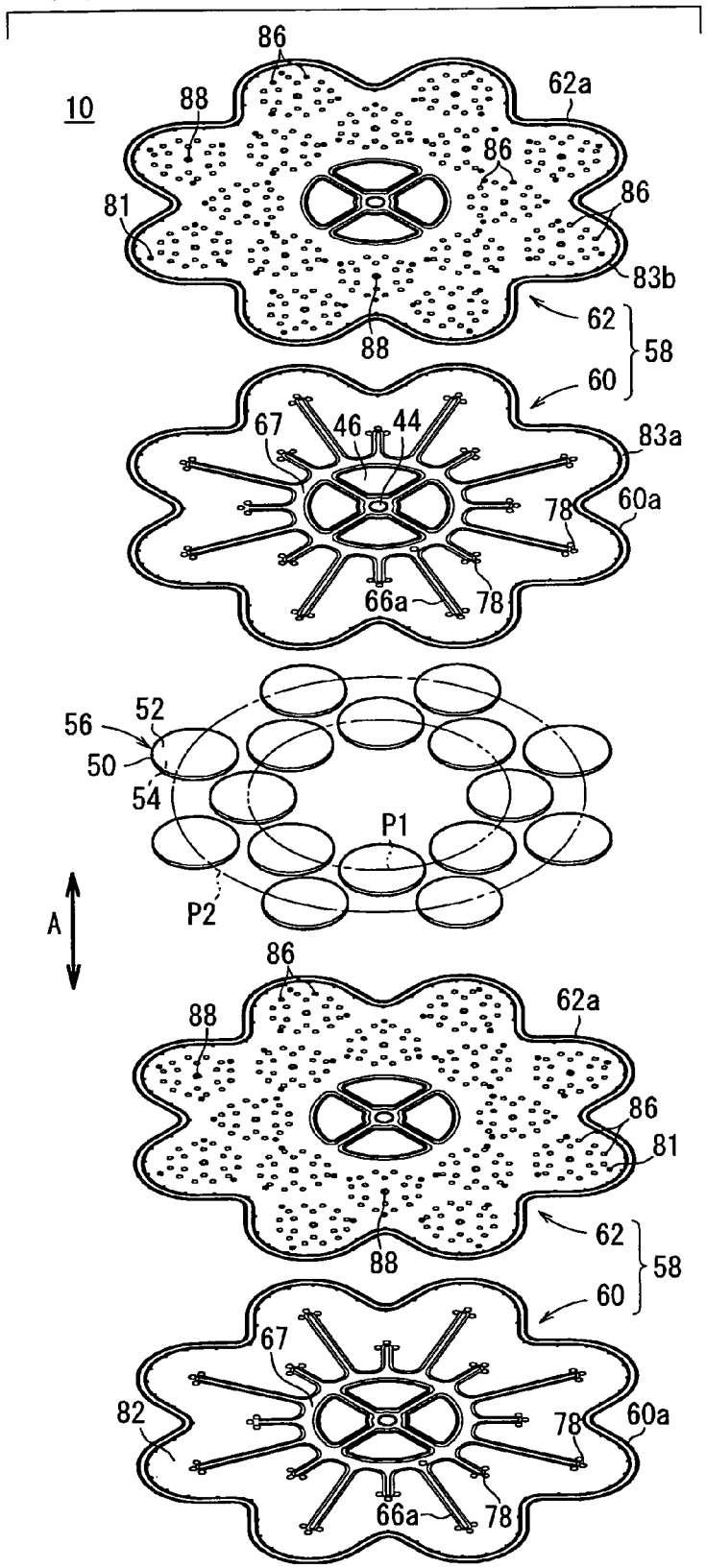
FIG. 4 is an exploded perspective view of the fuel cell.
Figure 5:
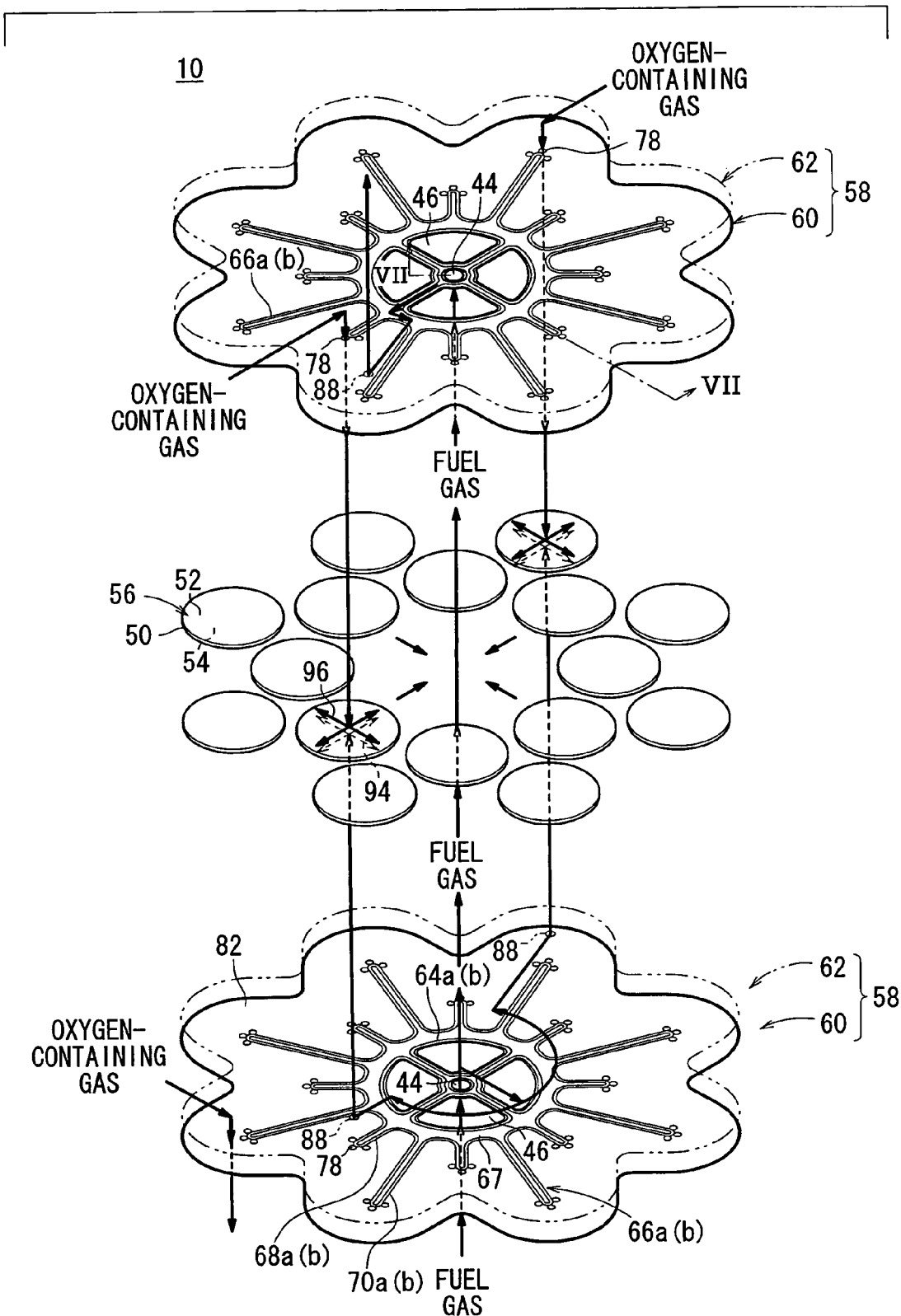
FIG. 5 is a perspective view showing part of the fuel cell and operation of the fuel cell.

As shown in FIGS. 4 and 5, the fuel cell 10 includes electrolyte electrode assemblies 56. Each of the electrolyte electrode assemblies 56 includes a cathode 52, an anode 54, and an electrolyte (electrolyte plate) 50 interposed between the cathode 52 and the anode 54. The electrolyte 50 is formed of an ion-conductive solid oxide such as stabilized zirconia. The electrolyte electrode assembly 56 has a relatively small circular disk shape.

Figure 6:
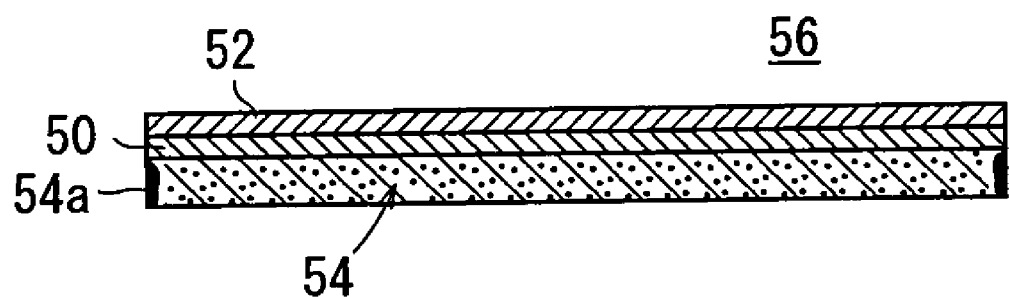
FIG. 6 is a cross sectional view showing an electrolyte electrode assembly of the fuel cell.

The anode 54 shown in FIG. 6 is made of porous material of Ni, for example. A dense layer 54a is formed integrally on the outer circumferential surface of the anode 54 by densifying process. The dense layer 54a functions as a protective layer for preventing an exhaust gas from flowing into the anode 54. Specifically, the dense layer 54a is formed by heating the outer circumferential surface of the anode 54 by a laser, for example.

As shown in FIGS. 4 and 5, a plurality of (e.g., 16) the electrolyte electrode assemblies 56 are interposed between a pair of separators 58 to form the fuel cell 10. The electrolyte electrode assemblies 56 are arranged along an inner circle P1 and an outer circle P2 which are concentric with the fuel gas supply hole 44 formed at the center of the separators 58. The inner circle P1 passes through centers of eight inner electrolyte electrode assemblies 56, and the outer circle P2 passes through centers of eight outer electrolyte electrode assemblies 56 (see FIG. 4).

Each of the separators 58 includes a plurality of (e.g., two) plates 60, 62 which are stacked together. Each of the plates 60, 62 is formed of a stainless alloy, for example. Curved outer sections 60a, 62a are formed on the plates 60, 62, respectively (see FIGS. 8 and 9).

Figure 7:
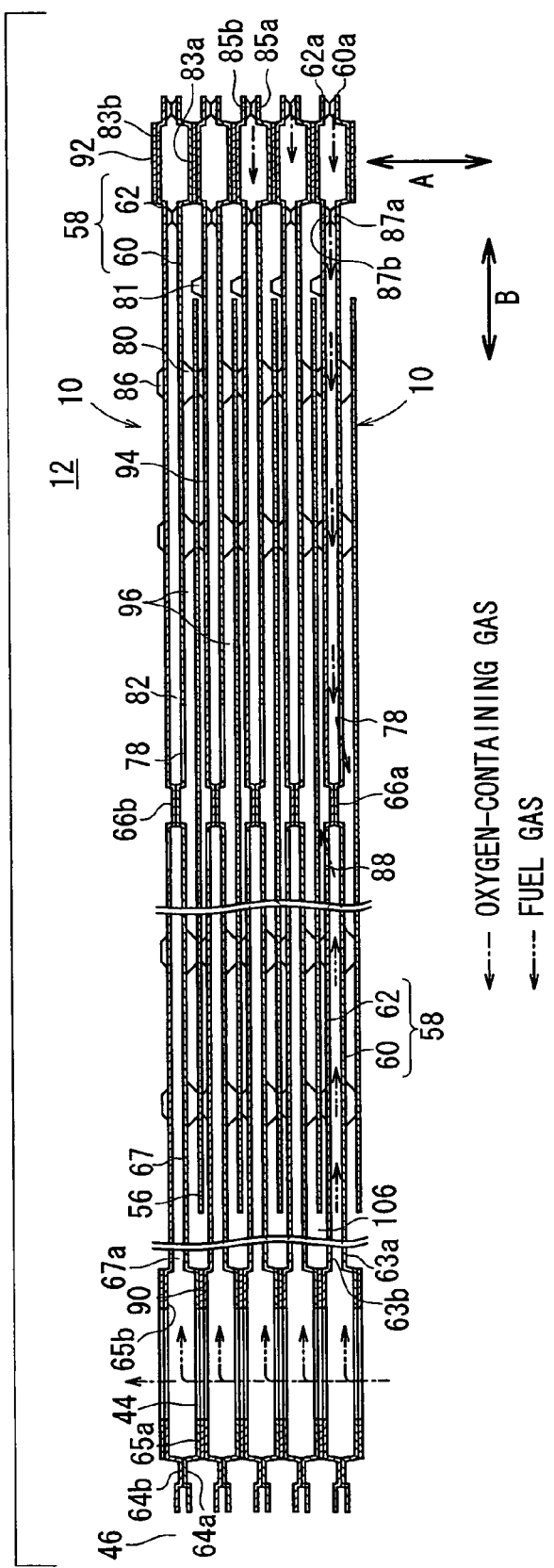
FIG. 7 is a cross sectional view of the fuel cell stack taken along a line VII-VII in FIG. 5.
Figure 8:
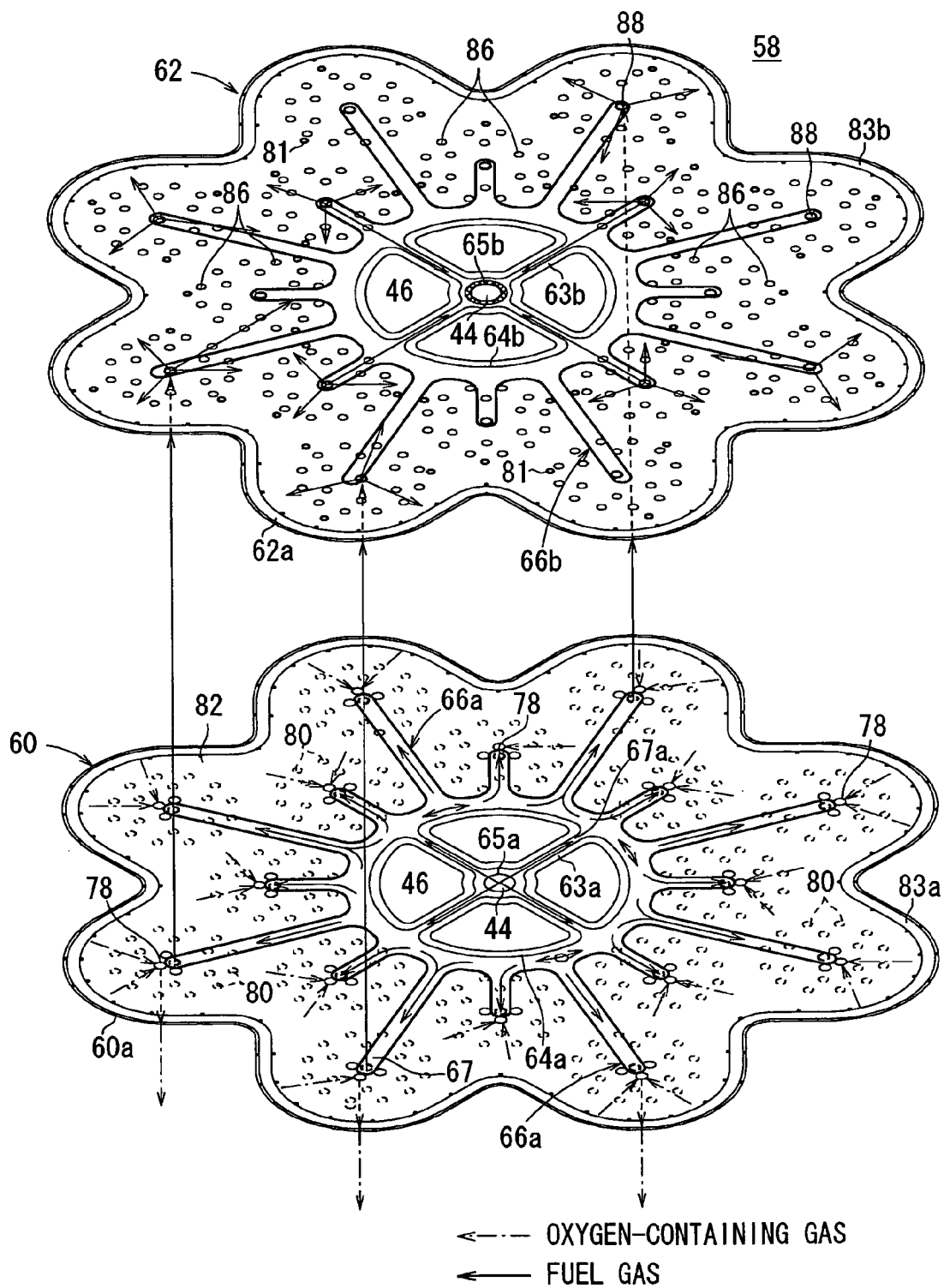
FIG. 8 is an exploded perspective view showing a separator of the fuel cell.
Figure 10:
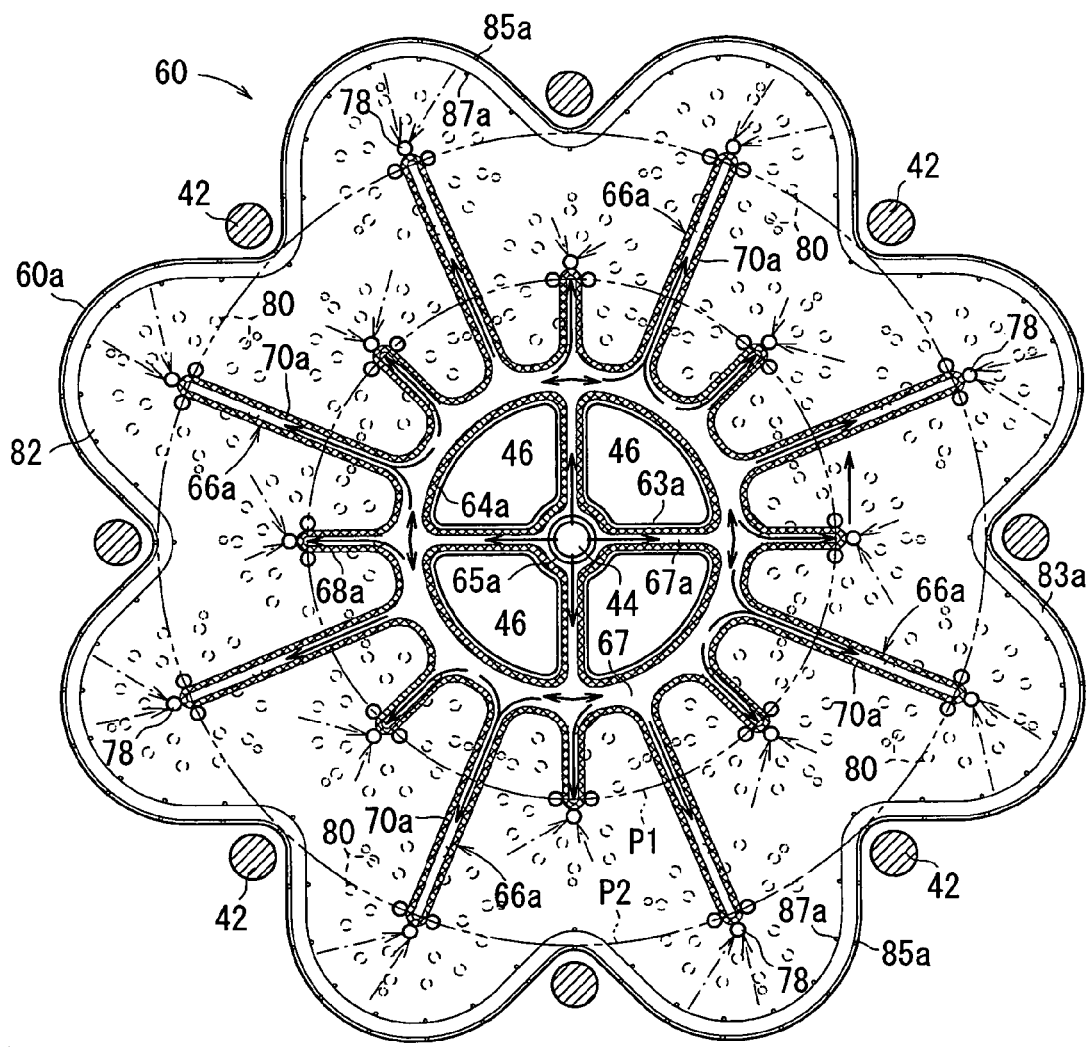
FIG. 10 is a front view showing a plate of the separator.

As shown in FIGS. 7, 8, and 10, ribs 63a are provided around the center of the plate (first plate) 60 to form the fuel gas supply hole 44 and the four discharge passages 46. The plate 60 has four inner ridges 64a around the respective discharge passages 46. The inner ridges 64a protrude toward the plate (second plate) 62. The plate 60 has a protrusion 65a around the fuel gas supply hole 44. The protrusion 65a protrudes away from the plate 62 in a direction opposite to the inner ridges 64a.

An outer ridge 66a is formed radially outwardly around the fuel gas supply hole 44 on the plate 60. A fuel gas channel 67 is formed between the inner ridges 64a and the outer ridge 66a. The fuel gas channel 67 is connected to the fuel gas supply hole 44 through fuel gas distribution passages 67a. Each of the fuel gas distribution passages 67a extends between the ribs 63a forming the discharge passages 46 along a surface of the separator 58, in a direction indicated by an arrow B, i.e., perpendicularly to the stacking direction for connecting the fuel gas supply hole 44 and the fuel gas supply channel 67.

The outer ridge 66a includes a plurality of first walls 68a and second walls 70a each extending radially outwardly by a predetermined distance. The first walls 68a and the second walls 70a are formed alternately. As shown in FIG. 10, each of the first walls 68a extends to the inner circle P1 which is a virtual line passing through centers of eight inner electrolyte electrode assemblies 56. Each of the second walls 70a extends to the outer circle P2 which is a virtual line passing through centers of eight outer electrolyte electrode assemblies 56. The eight inner electrolyte electrode assemblies 56 are arranged along the inner circle P1, and the eight outer electrolyte electrode assemblies 56 are arranged along the outer circle P2.

At each end portion of the first walls 68a and at each end portion of the second walls 70a, three oxygen-containing gas inlets 78 are formed. The oxygen-containing gas inlets 78 are formed to pass through the plate 60. The plate 60 has first bosses 80 protruding toward, and contact the electrolyte electrode assemblies 56 arranged along the inner circle P1 and the outer circle P2.

Figure 9:
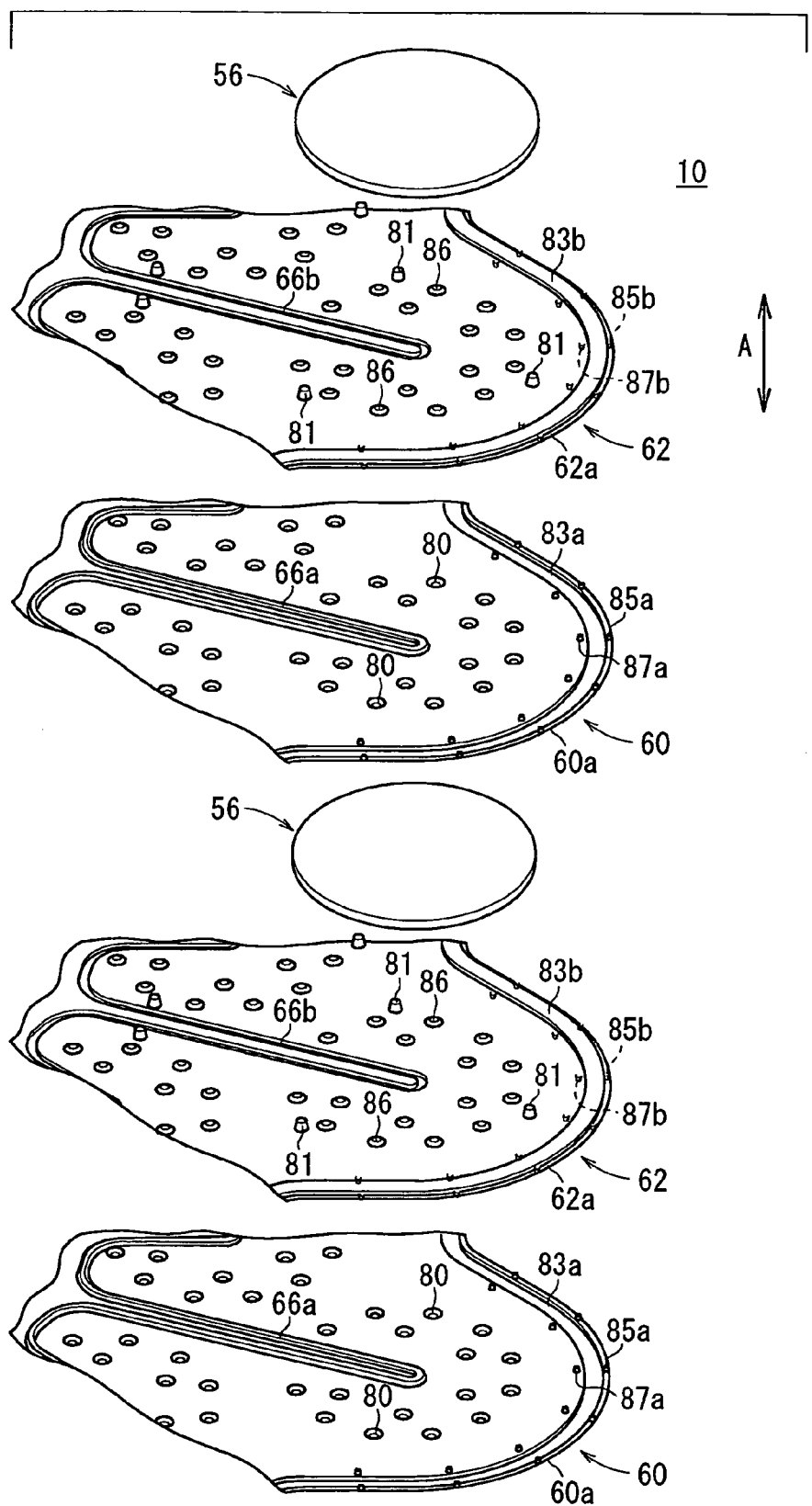
FIG. 9 is an exploded perspective view showing part of the fuel cell.

As shown in FIGS. 7, 9, and 10, a first curved circumferential ridge 83a is formed on the plate 60 along the curved outer section 60a. The first circumferential ridge 83a has the shape identical to the curved outer section 60a, and protrudes away from the plate 62. Outer projections 85a and inner projections 87a are provided at predetermined intervals on opposite sides of the first circumferential ridge 83a to face each other.

Figure 11:
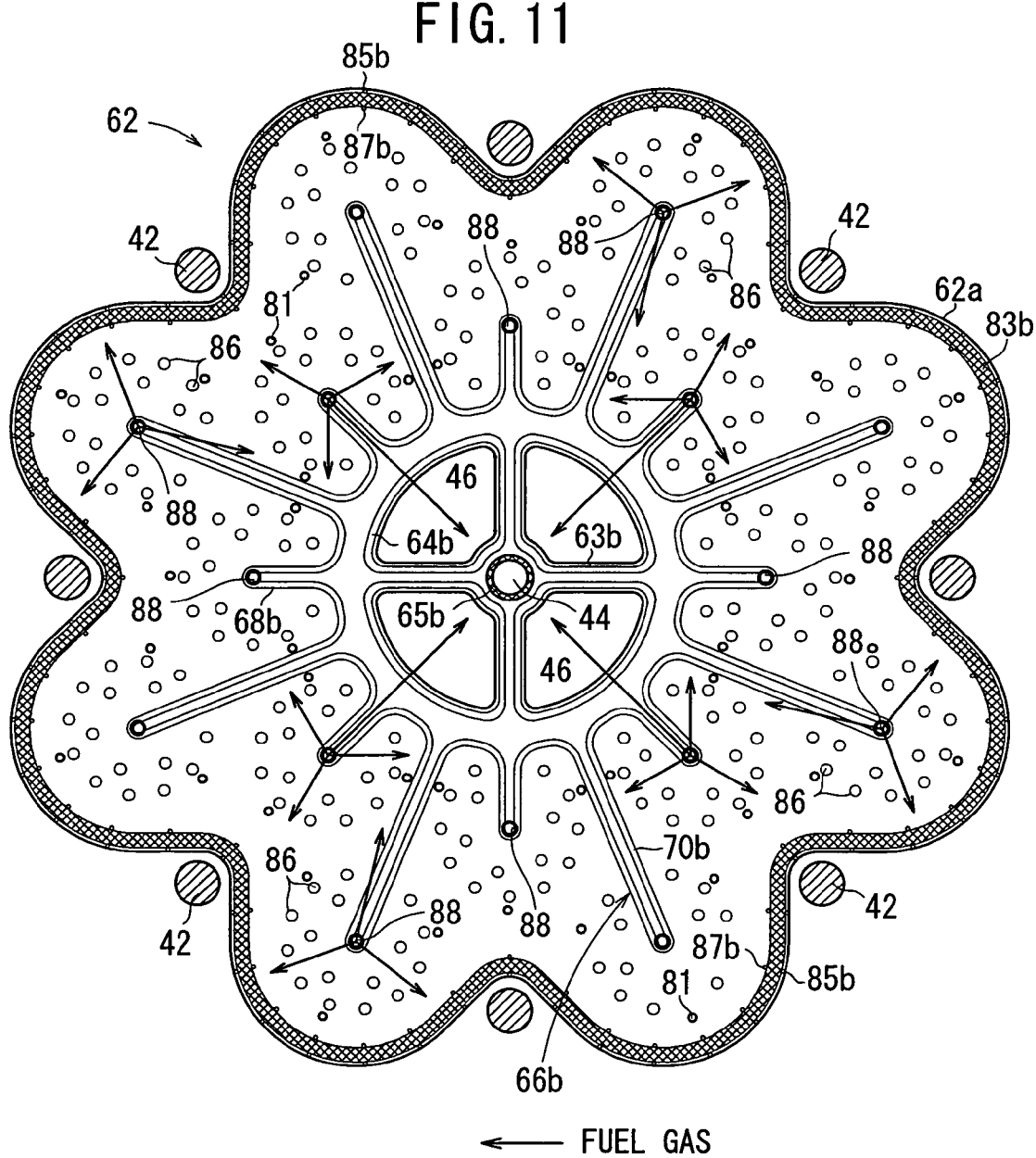
FIG. 11 is a front view showing the other plate of the separator.

As shown in FIGS. 7, 8, and 11, ribs 63b facing the ribs 63a are provided around the center of the plate 62. The plate 62 has four inner ridges 64b protruding toward the plate 60, and a protrusion 65b protruding away form the plate 60. When the plates 60, 62 are connected together, a space extending through the protrusions 65a, 65b protruding away from each other form the fuel gas supply hole 44.

An outer ridge 66b protruding toward the outer ridge 66a of the plate 60 is formed on the plate 62. The inner ridges 64a contact the inner ridges 64b, and the outer ridge 66a contact the outer ridge 66b to form the fuel gas channel 67 between the plate 60 and the plate 62. The fuel gas channel 67 is connected to the fuel gas supply hole 44 through the fuel gas distribution passages 67a. The outer ridge 66b includes a plurality of first walls 68b and second walls 70b each extending radially outwardly by a predetermined distance. The first walls 68b and the second walls 70b are formed alternately.

Further, the plate 62 has second bosses 86 protruding toward, and contact the electrolyte electrode assemblies 56 arranged along the inner circle P1 and the outer circle P2. The second bosses 86 have small dimensions (height and diameter) in comparison with the first bosses 80. Fuel gas inlets 88 are formed to pass through the plate 62. The fuel gas inlets 88 are connected to the fuel gas channel 67.

Protrusions 81 for positioning the eight electrolyte electrode assemblies 56 along the inner circle P1 and the eight electrolyte electrode assemblies 56 along the outer circle P2 are provided on the plate 62. At least three protrusions 81 are formed for each of the electrolyte electrode assemblies 56. In the first embodiment, three protrusions 81 are formed for positioning one electrolyte electrode assembly 56, for example. When the electrolyte electrode assembly 56 is positioned inside the protrusions 81, there is some clearance between the protrusions 81 and the electrolyte electrode assembly 56. The height of the protrusions 81 is greater than the height of the second bosses 86 (see FIG. 7).

As shown in FIGS. 7, 9, and 11, a second circumferential ridge 83b is formed on the plate 62 along the curved outer section 62a. The second circumferential ridge 83b has the shape identical to the curved outer section 62a, and protrudes away from the plate 60. Outer projections 85b and inner projections 87b are provided at predetermined intervals on opposite sides of the second circumferential ridge 83b to face each other.

The fuel gas channel 67 is surrounded by the inner ridges 64a, 64b, and the outer ridges 66a, 66b between the plate 60 and the plate 62. An oxygen-containing gas channel 82 is formed outside the outer ridges 66a, 66b between the plate 60 and the plate 62 (see FIG. 12). The oxygen-containing gas channel 82 is connected to the oxygen-containing gas inlets 78 formed on the plate 60.

As shown in FIG. 7, the separator 58 has an insulator seal 90 for sealing the fuel gas supply hole 44. The insulator seal 90 is formed by placing a ceramics plate, or thermally spraying ceramics to the protrusion 65a of the plate 60 or the projection 65b of the plate 62. The first circumferential ridge 83a of the plate 60 and the second circumferential ridge 83b of the plate 62 protrude away from each other, and forms an space between the first circumferential ridge 83a and the second circumferential ridge 83b as part of the oxygen-containing gas channel 82. An insulator seal 92 formed of ceramics or the like is provided on the first circumferential ridge 83a or the second circumferential ridge 83b by sandwiching the insulator seal 92 between the first circumferential ridge 83a and the second circumferential ridge 83b or by thermal spraying.

As shown in FIGS. 5 and 7, the electrolyte electrode assemblies 56 are interposed between the plate 60 of one separator 58 and the plate 62 of the other separator 58. Specifically, the plate 60 and the plate 62 on both sides of the electrolyte electrode assemblies 56 have the first bosses 80 and the second bosses 86, respectively. The first bosses 80 and the second bosses 86 protrude toward the electrolyte electrode assemblies 56 for sandwiching the electrolyte electrode assemblies 56.

Figure 12:
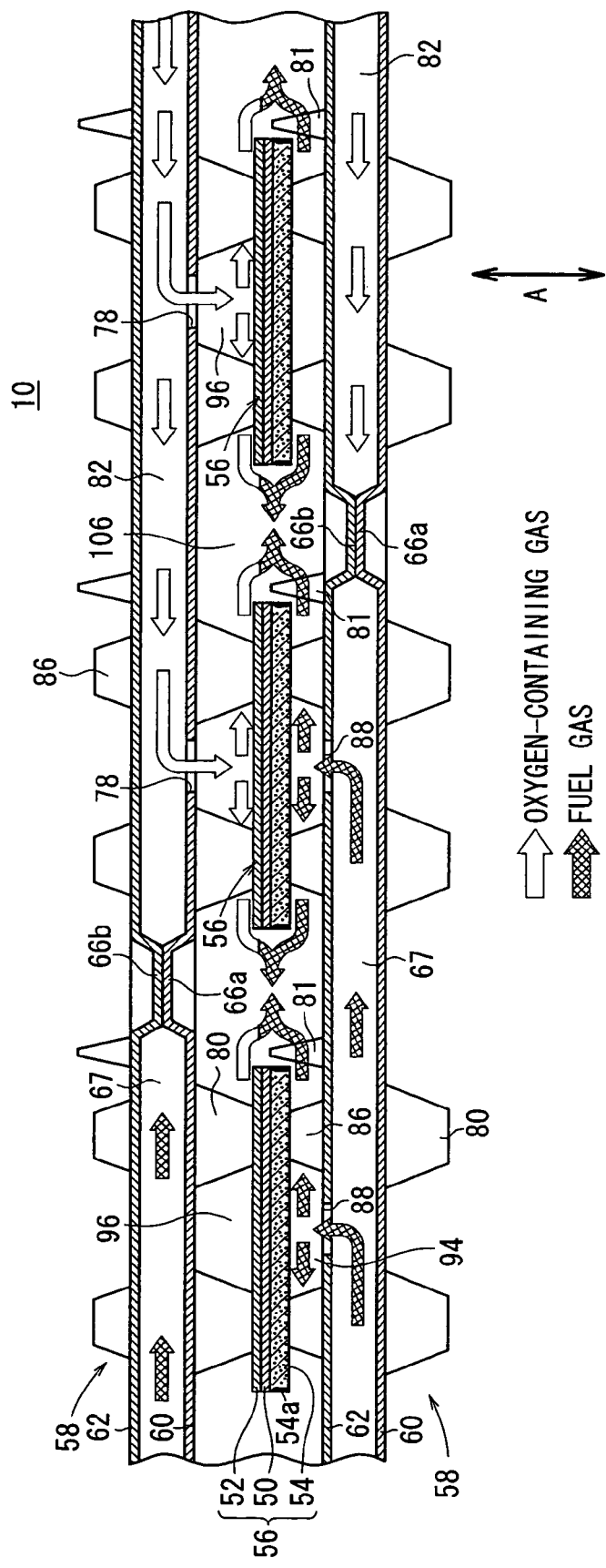
FIG. 12 is a view showing operation of the fuel cell.

As shown in FIG. 12, a fuel gas flow passage 94 connected to the fuel gas channel 67 through the fuel gas inlets 88 is formed between the electrolyte electrode assemblies 56 and the plate 62 of the separator 58. Further, an oxygen-containing gas flow passage 96 connected to the oxygen-containing gas channel 82 through the oxygen-containing gas inlets 78 is formed between the electrolyte electrode assemblies 56 and the plate 60 of the other separator 58 on the opposite side. The size of the opening of the fuel gas flow passage 94 depends on the height of the second bosses 86. The size of the opening of the oxygen-containing gas flow passage 96 depends on the height of the first bosses 80. The flow rate of the fuel gas is smaller than the flow rate of the oxygen-containing gas. Therefore, the dimensions of the second bosses 86 are smaller than the dimensions of the first bosses 80.

As shown in FIG. 7, the fuel gas channel 67 is connected to the fuel gas supply hole 44 extending through the protrusions 65a, 65b of the separator 58. The oxygen-containing gas channel 82 and the fuel gas channel 67 are formed on the same area inside the separator 58. The oxygen-containing gas channel 82 is open to the outside through the spacing between the first and second circumferential ridges 83a, 83b of the plates 60, 62 of the separator 58.

Each of the separators 58 stacked in the stacking direction has the first bosses 80 and the second bosses 86 for sandwiching the electrolyte electrode assemblies 56. The first bosses 80 and the second bosses 86 function as current collectors. The outer ridge 66a of the plate 60 is in contact with the outer ridge 66b of the plate 62, and the inner ridges 64a of the plate 60 are in contact with the inner ridges 64b of the plate 62 for serially connecting the fuel cells 10 in the direction indicated by the arrow A.

As shown in FIGS. 1 and 2, the fuel cells 10 are stacked in the direction indicated by the arrow A. End plates 97a, 97b are stacked on the outermost fuel cells 10 at opposite ends. Insulator plates 98a, 98b are stacked on the outside of the end plates 97a, 97b, respectively, and flanges 40a, 40b are stacked on the outside of the insulator plates 98a, 98b, respectively. The flanges 40a, 40b have holes 100a, 100b at positions corresponding to the inward curves of the curved outer sections 60a, 62a of the plates 60, 62. Tightening bolts 42 are inserted in the holes 100a, 100b. Ends of the tightening bolts 42 are screwed into nuts 104 for tightening the fuel cells 10 together with a suitable force.

Next, operation of the fuel cell stack 12 will be described below.

In assembling the fuel cell 10, the plate 60 and the plate 62 are connected together to form the separator 58. Specifically, as shown in FIG. 7, the outer ridge 66a and the inner ridges 64a of the plate 60 are connected to the outer ridge 66b and the inner ridges 64b of the plate 62 by brazing, and the ring-shaped insulator seals 90 are provided on the plate 60 or the plate 62 around the fuel gas supply hole 44 by thermal spraying, for example. Further, the insulator seal 92 having curves is provided on the first circumferential edge 83a of the plate 60 or the second circumferential edge 83b of the plate 62 by thermal spraying, for example.

The separator 58 thus formed has the fuel gas channel 67 and the oxygen-containing gas channel 82 on the same area between the plate 60 and the plate 62. The fuel gas channel 67 is connected to the fuel gas supply hole 44 through the fuel gas distribution passages 67a, and the oxygen-containing gas channel 82 between the curved outer section 60a and the curved outer section 62a is open to the outside.

Then, the electrolyte electrode assemblies 56 are interposed between a pair of separators 58. As shown in FIGS. 4 and 5, sixteen electrolyte electrode assemblies 56 are interposed between the plate 60 of one separator 58 and the plate 62 of the other separator 58. Eight electrolyte electrode assemblies 56 are arranged along the inner circle P1, and eight electrolyte electrode assemblies 56 are arranged along the outer circle P2.

Three protrusions 81 are provided for positioning each of the electrolyte electrode assemblies 56. The electrolyte electrode assembly 56 is placed inside the three protrusions 81. The first bosses 80 of the plate 60 and the second bosses 86 of the plate 62 protrude toward, and contact the electrolyte electrode assembly 56 inside the protrusions 81 (see FIG. 7).

As shown in FIG. 12, the oxygen-containing gas flow passage 96 is formed between the cathodes 52 of the electrolyte electrode assemblies 56 and the plate 60. The oxygen-containing gas flow passage 96 is connected to the oxygen-containing gas channel 82 through the oxygen-containing gas inlets 78. The fuel gas flow passage 94 is formed between the anodes 54 of the electrolyte electrode assemblies 56 and the plate 62. The fuel gas flow passage 94 is connected to the fuel gas channel 67 through the fuel gas inlets 88. An exhaust gas channel 106 is formed between the separators 58 for guiding the exhaust gas (mixed gas of the fuel gas and the oxygen-containing gas after reaction) to the discharge passages 46.

A plurality of the fuel cells 10 as assembled above are stacked in the direction indicated by the arrow A to form the fuel cell stack 12 (see FIGS. 1 and 2).

The fuel gas such as a hydrogen containing gas is supplied to the fuel gas supply hole 44 of the flange 40b, and the oxygen-containing gas such as air is supplied from the outside of the fuel cell stack 12 under pressure. The fuel gas supplied to the fuel gas supply hole 44 flows in the stacking direction indicated by the arrow A, and is supplied to the fuel gas channel 67 through the fuel gas distribution passages 67a formed in each of the separators 58 of the fuel cells 10 (see FIG. 7).

As shown in FIG. 5, the fuel gas from the first gas channel 67 flows along the first walls 68a, 68b and the second walls 70a, 70b of the outer ridges 66a, 66b, and flows into the fuel gas flow passage 94 through the fuel gas inlets 88. The fuel gas inlets 88 are formed at end portions of the first walls 68a, 68b and the second walls 70a, 70b, i.e., at positions corresponding to central regions of the anodes 54 of the electrolyte electrode assemblies 56. The fuel gas supplied to the fuel gas flow passage 94 flows outwardly from the central regions of the anodes 54 (see FIG. 12).

The oxygen-containing gas is supplied to each of the fuel cells 10 from the outside. The oxygen-containing gas is supplied to the oxygen-containing gas channel 82 formed in each of the separators 58, between the plate 60 and the plate 62. The oxygen-containing gas supplied to the oxygen-containing gas channel 82 flows into the oxygen-containing gas flow passage 96 from the oxygen-containing gas inlets 78, and flows outwardly from central regions of the cathodes 52 of the electrolyte electrode assemblies 56 (see FIGS. 5 and 12).

Therefore, in each of the electrolyte electrode assemblies 56, the fuel gas is supplied to the central region of the anode 54, and flows outwardly from the central region of the anode 54. Similarly, the oxygen-containing gas is supplied to the central region of the cathode 52, and flows outwardly from the central region of the cathode 52. The oxygen-ion passes from the cathode 52 to the anode 54 through the electrolyte 50 to generate electricity by electrochemical reactions.

In the present embodiment, the electrolyte electrode assemblies 56 are sandwiched between the first bosses 80 and the second bosses 86. Therefore, the first bosses 80 and the second bosses 86 function as current collectors. The fuel cells 10 are electrically connected in series in the stacking direction indicated by the arrow A. The electricity can be outputted from the output terminals 48a, 48b. Even if some of the electrolyte electrode assemblies 56 have power failures, the fuel cell stack 12 can be energized by the other electrolyte electrode assemblies 56. Therefore, the power generation can be performed reliably.

After reaction of the fuel gas and the oxygen-containing gas, the exhaust gas moves outwardly from the central regions of the electrolyte electrode assemblies 56 through the exhaust gas channel 106 between the separators 58, and flows toward the center of the separators 58. The exhaust gas flows into the four discharge passages 46 formed near the center of separators 58 as an exhaust gas manifold, and is discharged from the discharge passages 46 to the outside.

Generally, the oxygen-containing gas such as the air is supplied to the electrolyte electrode assemblies 56 excessively. After the unreacted fuel gas and the oxygen-containing gas are mixed together to induce reaction, oxygen is present in the exhaust gas. The outer region of the electrolyte electrode assembly 56, in particular, the outer region of the anode 54 is exposed to the exhaust gas containing oxygen. Therefore, the outer region of the anode 54 is likely to be oxidized undesirably.

In an attempt to solve the problem, in the first embodiment of the present invention, as shown in FIG. 6, the dense layer 54a is formed integrally around the outer circumferential region of the anode 54. The exhaust gas is shielded by the dense layer 54, and does flow into the anode 54. Therefore, reduction reaction of NiO is not prevented in the anode 54 even if oxygen is present in the exhaust gas.

NiO of the anode 54 is suitably reduced into Ni. Therefore, the anode 54 functions desirably, and thus, almost all the power generation surface of the electrode electrolyte assembly 56 can be used for power generation. The desired power generation efficiency can be achieved in each of the fuel cells 10.

The thin dense layer 54a can be formed simply by heating the outer circumferential region of the anode 54 by the laser, for example. The constituent material of the dense layer 54a is same as the constituent material of the anode 54. Therefore, the dense layer 54a does not adversely affect the power generation, i.e., the effective power generation surface area is not reduced by the presence of the dense layer 54a. Fuel utilization ratio is maintained in each of the electrolyte electrode assemblies 56, and the desired power generation efficiency can be achieved.

Figure 13:
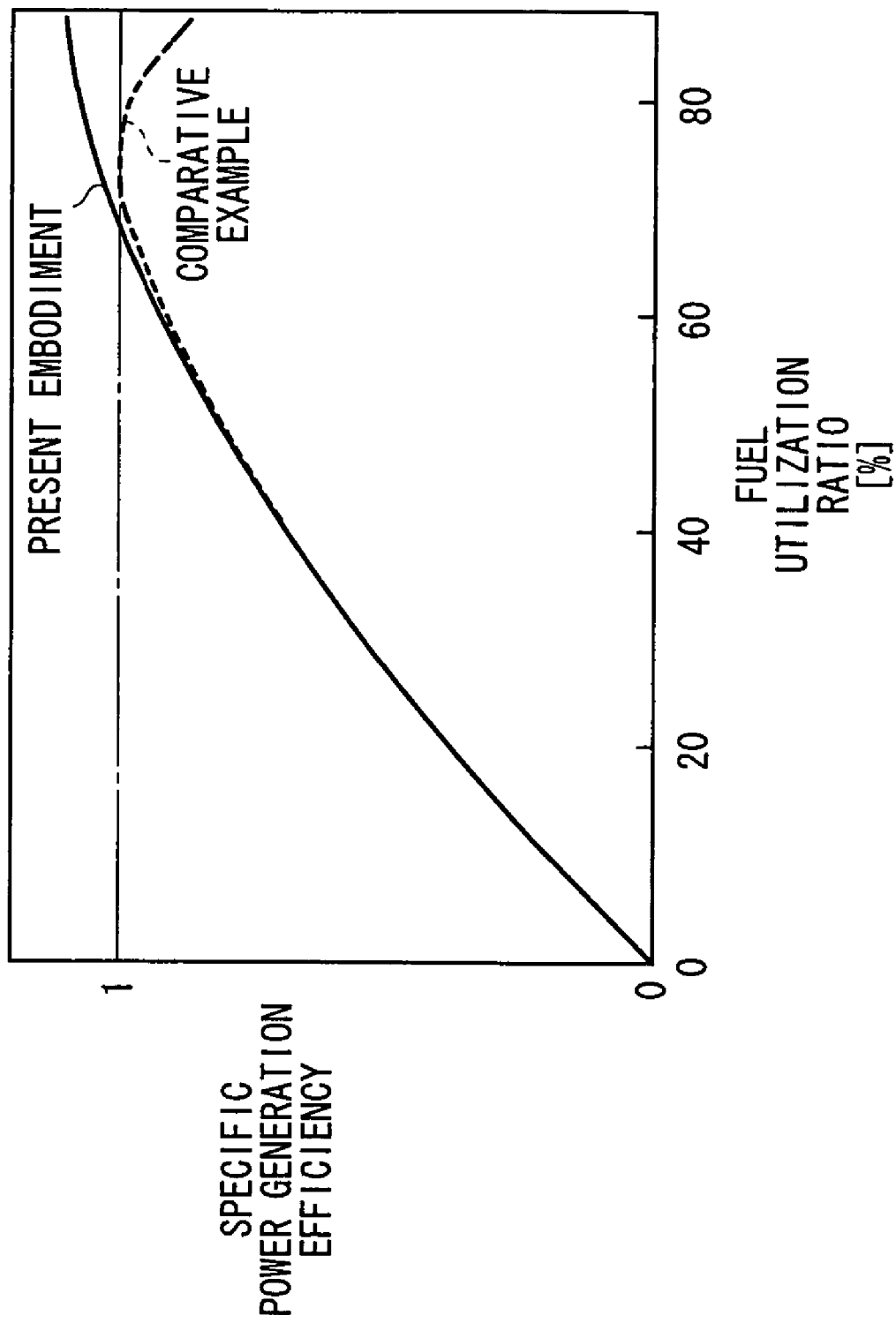
FIG. 13 is a view showing relationship between fuel utilization ratio and specific power generation efficiency in each of the fuel cell of the present embodiment and a fuel cell of a comparative example.

Next, two types of fuel cells were produced as an experiment. One of the fuel cell was produced according to the present embodiment, and has the dense layer 54a around the outer circumferential surface of the anode 54. The other fuel cell was produced as a comparative example, and does not have the dense layer 54a. The fuel utilization ratios and specific power generation efficiencies of these fuel cells are shown in FIG. 13. A specific power generation efficiency is obtained by dividing a power generation efficiency by a predetermined value. The amount of hydrogen consumed in the power generation was calculated based on the current density. The amount of consumed hydrogen was divided by the total amount of hydrogen actually supplied to the fuel cell to determine the fuel utilization ratio. Further, the electrical energy generated at the time of measurement is calculated by multiplying the current density by the voltage. The generated electrical energy is divided by the energy which is calculated by deducting the latent heat energy of vaporization from the total enthalpy of hydrogen supplied to the fuel cell to determine the power generation efficiency.

As can be seen from FIG. 13, when the fuel utilization ratio is low, only the central region of the electrode (power generation surface) is used for power generation, and the difference of the surface area used for power generation does not affect the power generation efficiency. When the fuel utilization ratio is high, a large surface area is required for power generation. Therefore, the power generation efficiency largely depends on the surface area available for power generation. In the fuel cell according to the comparative example, the outer circumferential region of the anode 54 is composed of NiO since the reduction of Ni does not occur smoothly. Therefore, the surface area used for power generation was small, and the desired power generation characteristics were not achieved.

In contrast, in the fuel cell according to the present invention, the dense layer 54a is formed around the outer circumferential region of the anode 54. A large surface area of the anode 54 can be used for power generation. Thus, the desired power generation characteristics were achieved. In summary, when the current density was low, there was no significant difference of the current-voltage characteristics (IV characteristics) between the fuel cell according to the present embodiment and the fuel cell according to the comparative example. When the current density was high, the fuel cell according to the present invention outputted a higher voltage, and the desired power generation characteristics were achieved.

Next, the operation of the fuel cell stack 12 used in the gas turbine 14 shown in FIG. 3 will be described briefly.

Figure 3:
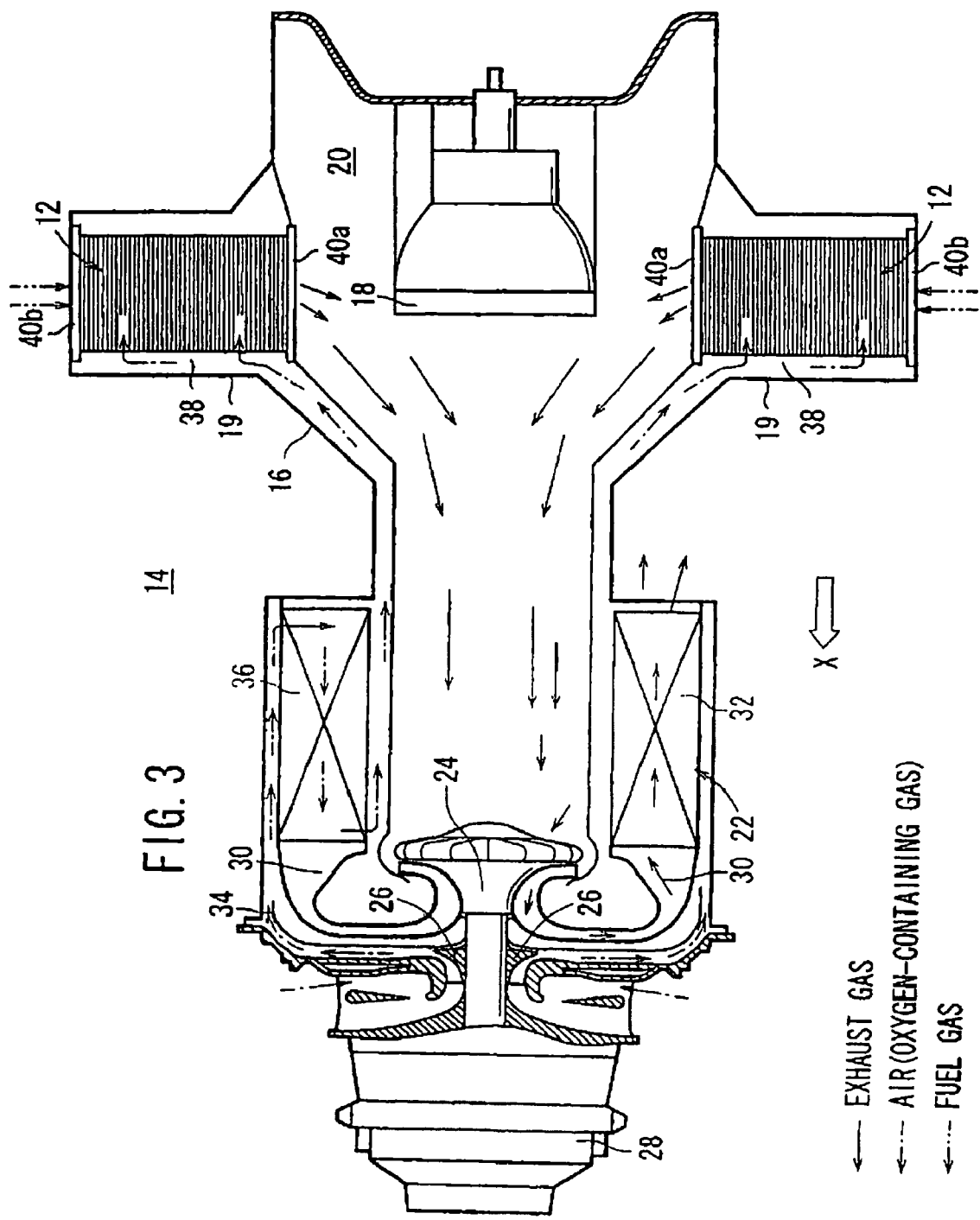
FIG. 3 is a view schematically showing a gas turbine including the fuel cell stacks.

As shown in FIG. 3, in starting the operation of the gas turbine 14, the combustor 18 is energized to spin the turbine 24, and energize the compressor 26 and the power generator 28. The compressor 26 functions to guide the external air into the supply passage 34. The air is pressurized and heated to a predetermined temperature (e.g., 200° C.), and supplied to the second passage 36 of the heat exchanger 22.

A hot exhaust gas as a mixed gas of the fuel gas and the oxygen-containing gas after reaction is supplied to the first passage 32 of the heat exchanger 22 for heating the air supplied to the second passage 36 of the heat exchanger 22. The heated air flows through the hot air supply passage 38, and supplied to the fuel cells 10 of the fuel cell stack 12 from the outside. Thus, the power generation is performed by the fuel cells 10, and the exhaust gas generated by the reaction of the fuel gas and the oxygen-containing gas is discharged into the chamber 20 in the casing 16.

At this time, the temperature of the exhaust gas discharged from the fuel cells (solid oxide fuel cells) 10 is high, in the range of 800° C. to 1000° C. The exhaust gas spins the turbine 24 for generating electricity by the power generator 28. The exhaust air is supplied to the heat exchanger 22 for heating the external air. Therefore, it is not necessary to use the combustor 18 for spinning the turbine 24.

The hot exhaust gas in the range of 800° C. to 1000° C. can be used for internally reforming a fuel supplied to the fuel cell stack 12. Therefore, various fuels such as natural gas, butane, and gasoline can be used for the internal reforming.

Figure 14:
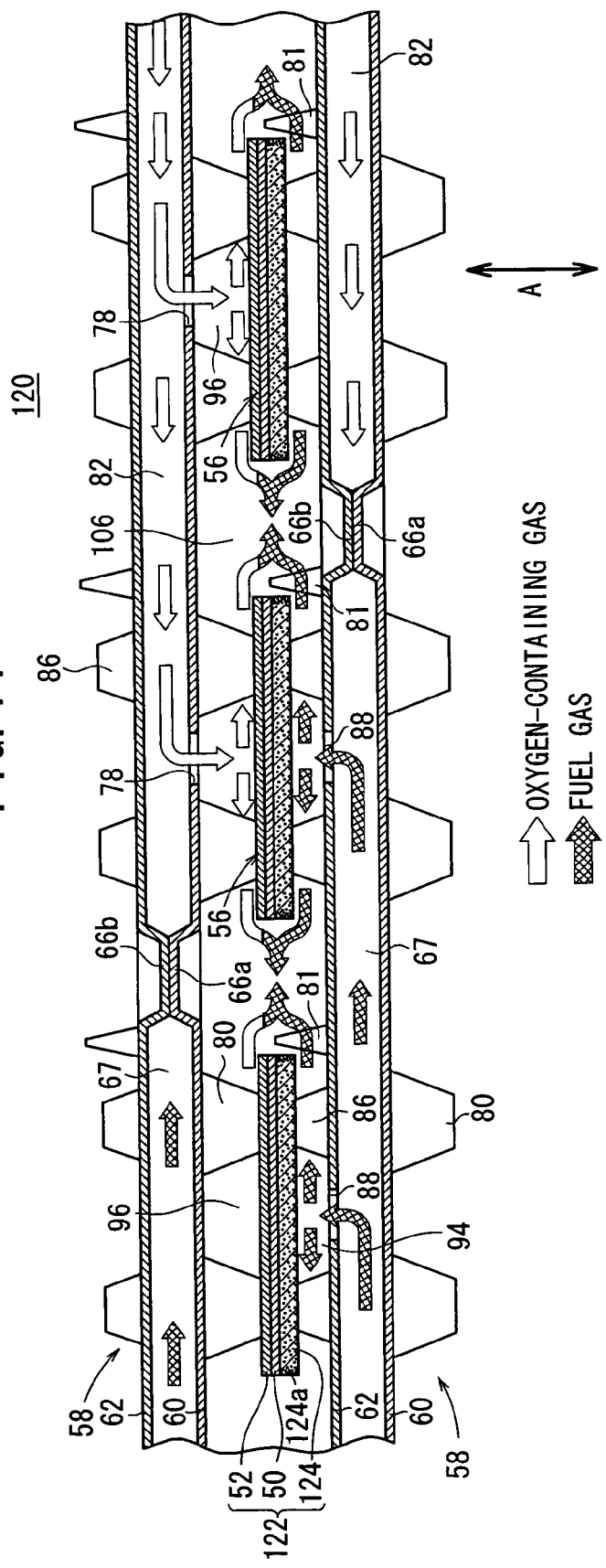
FIG. 14 is a view showing operation of a fuel cell according to a second embodiment of the present invention.

FIG. 14 is a cross sectional view schematically showing operation of a fuel cell 120 according to a second embodiment of the present invention. The constituent elements that are identical to those of the fuel cell 10 according to the first embodiment are labeled with the same reference numeral, and description thereof will be omitted.

The fuel cell 120 has an electrolyte electrode assembly 122 interposed between a pair of separators 58.

The electrolyte electrode assembly 122 includes an anode 124. The anode 124 is made of porous material of Ni, for example. A low porosity layer 124a is formed integrally around the outer circumferential region of the anode 124 as a protective layer. The porosity of the low porosity layer 124a is lower than the porosity of material in the anode 124, and prevents the exhaust gas from flowing into the anode 124.

In the second embodiment, the porosity inside the anode 124 is high. Therefore, the fuel gas flows smoothly inside the anode 124. The low porosity layer 124a covering the anode 124 has the low porosity. Therefore, oxygen in the exhaust gas does not flow into the anode 124.

Thus, in the second embodiment, the same advantages as with the first embodiment can be obtained. The electrolyte electrode assembly 122 has the large surface area for power generation, and the fuel utilization ratio is high.

Figure 15:
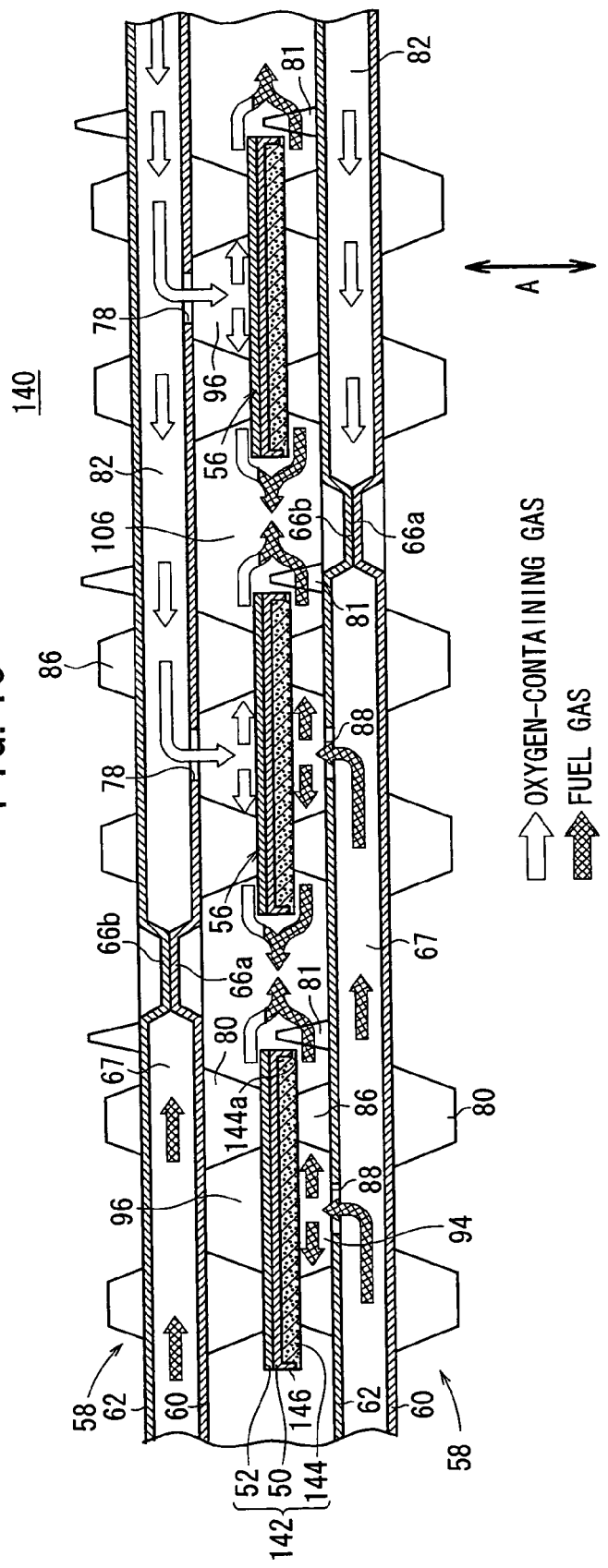
FIG. 15 is a view showing operation of a fuel cell according to a third embodiment of the present invention.

FIG. 15 is a cross sectional view schematically showing operation of a fuel cell 140 according to a third embodiment of the present invention.

The fuel cell 140 includes an electrolyte electrode assembly 142 interposed between a pair of separators 58. The electrolyte electrode assembly 142 includes an anode 144. The anode 144 is made of porous material of Ni, for example. An electrolyte layer 146 covers the outer circumferential surface of the anode 144 as a protective layer.

In producing the electrolyte electrode assembly 142, the electrolyte 50 is formed on the anode 144, and the cathode 52 is formed on the electrolyte 50. At this time, the electrolyte 50 is formed to include the electrolyte layer 146 which covers the outer circumferential surface of the anode 144. A portion 144a of the outer circumferential surface of the anode 144 is not covered by the electrolyte layer 146. The consumed fuel gas is smoothly discharged from the anode 144 through the portion 144a.

In the fuel cell 140 according to the third embodiment, oxygen in the exhaust gas does not flow into the anode 144. Therefore, as with the first and second embodiments, the effective surface area of the anode 144 used for power generation is not reduced, and the desired power generation efficiency is maintained.

Figure 16:
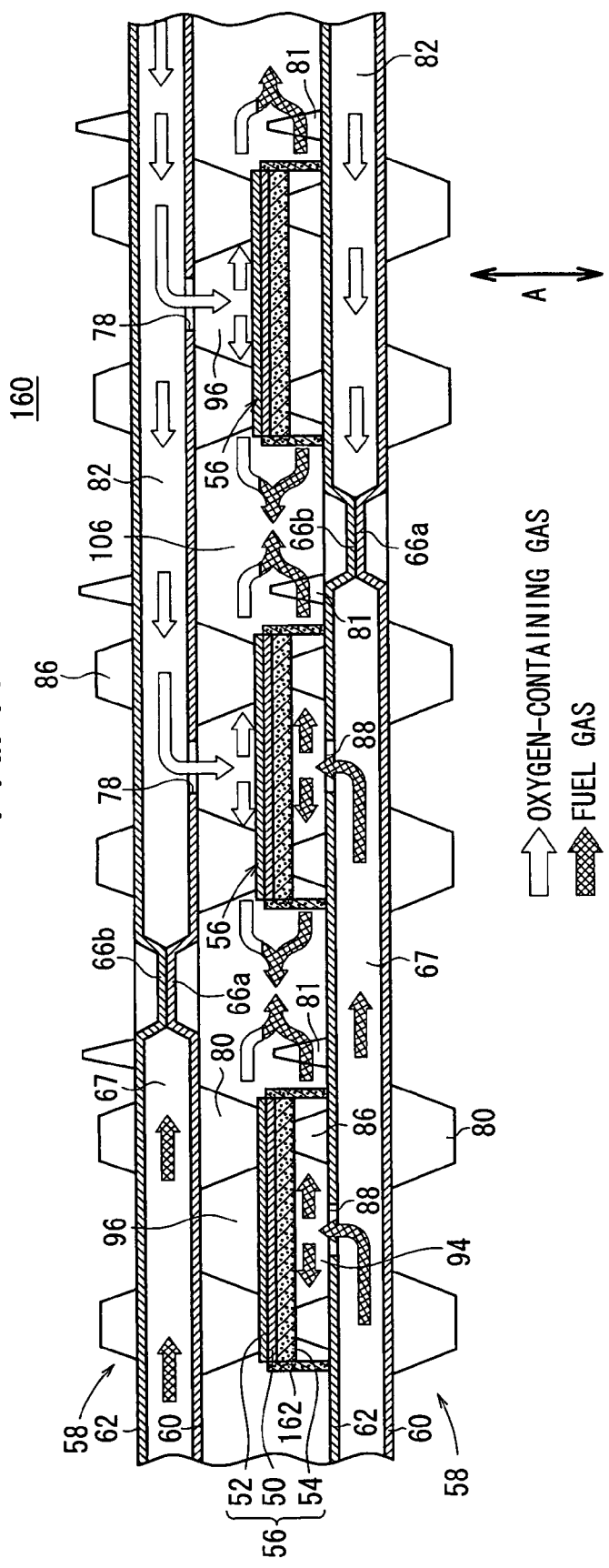
FIG. 16 is a view showing operation of a fuel cell according to a fourth embodiment of the present invention.

FIG. 16 is a cross sectional view showing operation of a fuel cell 160 according to a fourth embodiment of the present invention.

Figure 17:
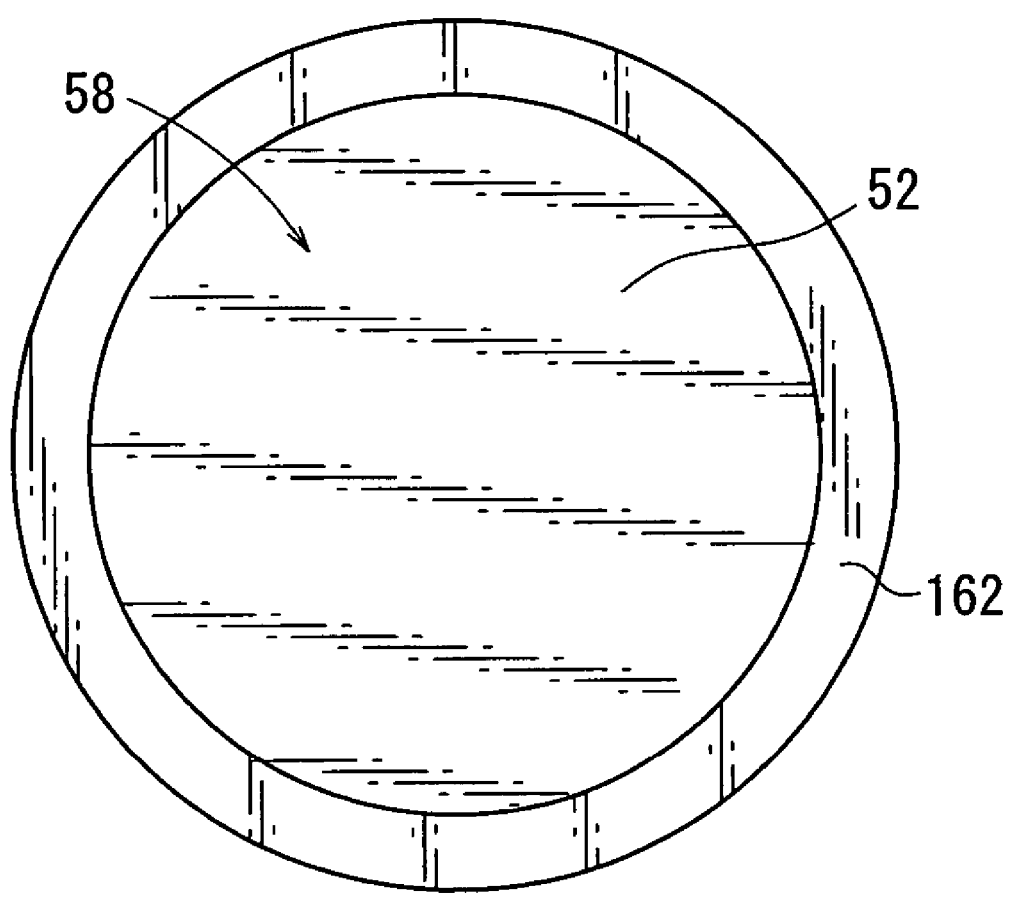
FIG. 17 is a plan view showing an electrolyte electrode assembly and a shield member.

The fuel cell 160 includes a shield member 162 provided around the outer circumferential region of the anode 54 of the electrolyte electrode assembly 56. The shield member 162 is made of thermally insulating porous material such as ceramic fiber or ceramic wool. As shown in FIG. 17, the shield member 162 has a ring shape.

As shown in FIG. 16, the shield member 162 is provided around the outer circumferential regions of the anode 54 and the electrolyte 50, below the lower end surface of the cathode 52. The consumed oxygen-containing gas is smoothly discharged from the outer circumferential region of the cathode 52. Oxygen in the oxygen-containing gas does not flow into the outer circumferential region of the anode 54.

The inner diameter of the shield member 162 and the outer diameter of the electrolyte electrode assembly 56 have substantially the same size. If there is a gap between the shield member 162 and the electrolyte electrode assembly 56, the exhaust gas may enter the gap undesirably. In the present invention, since the shield member 162 is fitted to the electrolyte electrode assembly 56, no gap is formed between the shield member 162 and the electrolyte electrode assembly 56. The thickness of the shield member 162 to prevent the undesirable entry of the exhaust gas can be determined depending on the material of the shield member 162. For example, if the shield member 162 is made of a material having a high porosity, the shield member 162 needs to have a large thickness in order to suitably prevent the undesirable entry of the exhaust gas through the shield member 162.

Thus, according to the fourth embodiment, the undesirable entry of the exhaust gas is prevented simply by using the ring-shaped shield member 162. Therefore, the fuel cell has the simple structure, and can be produced at a low cost.

Figure 18:
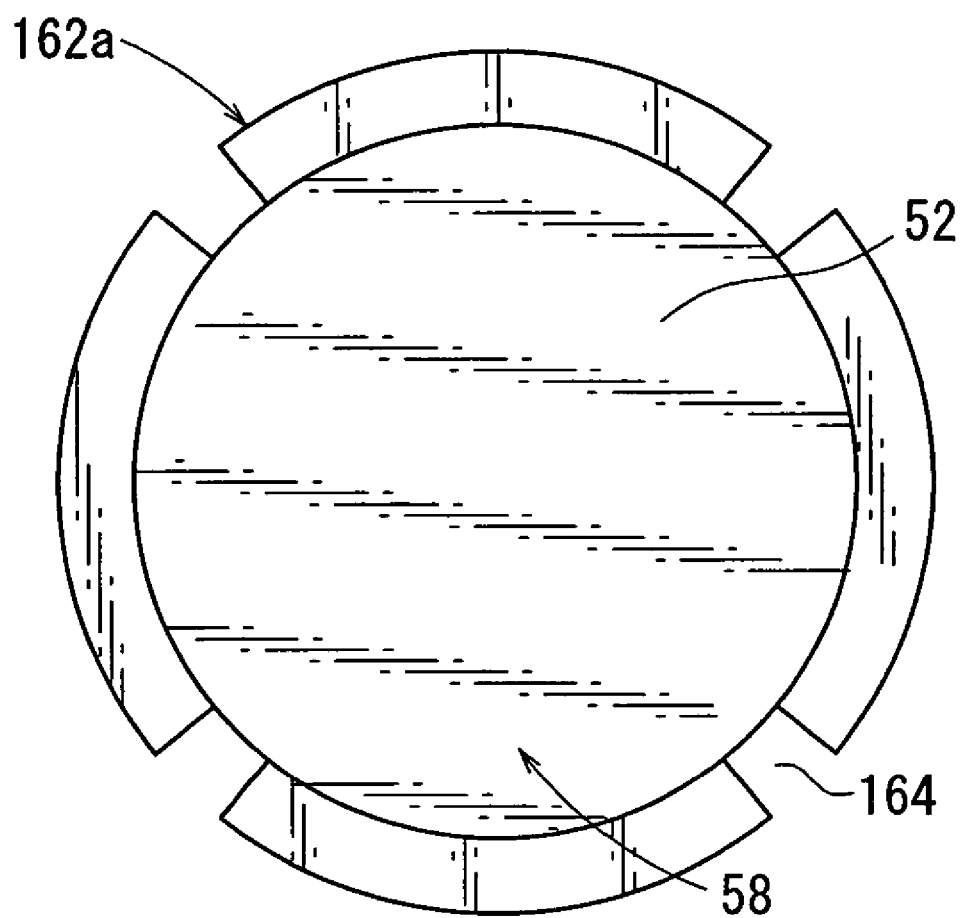
FIG. 18 is a plan view showing the electrolyte electrode assembly and another shield member.
Figure 19:
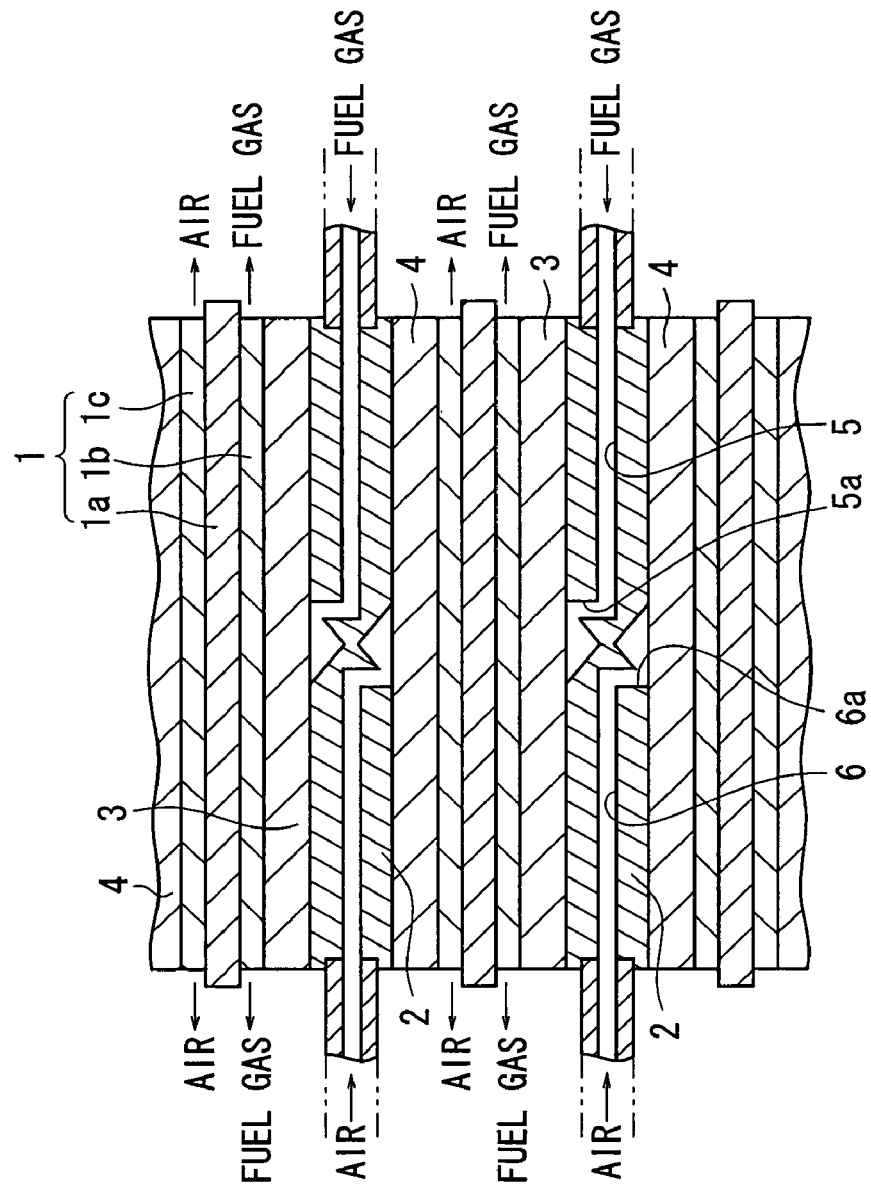
FIG. 19 is a cross sectional view showing a conventional fuel cell.

Depending on the application, various types of shield members can be used. For example, the shield member may be made of porous brick, or a formed body of ceramic fiber or ceramic wool having a low porosity. In this case, a plurality of openings need to be formed in the shield member for smoothly and reliably discharging the consumed fuel gas from the outer circumferential region of the anode 54. FIG. 18 shows a shield member 162a of this type having openings 164. The openings 164 may have various shapes depending on the application. The shield member 162a may comprise a plurality of arc-shaped members arranged separately on the anode 54.

The invention has been particularly shown and described with reference to preferred embodiments, it will be understood that variations and modifications can be effected thereto by those skilled in the art without departing from the spirit and scope of the invention as defined by the appended claims.

What is claimed is:

1. A solid oxide fuel cell comprising an electrolyte electrode assembly and a pair of separators sandwiching said electrolyte electrode assembly, said electrolyte electrode assembly including an anode, a cathode, and an electrolyte interposed between said anode and said cathode, wherein a fuel gas is supplied outwardly from a central region to a terminal end of said anode and an oxygen-containing gas is supplied to said cathode;

an exhaust gas including fuel gas and oxygen-containing gas after reaction is discharged outwardly from said electrolyte electrode assembly; and said anode includes a first portion made of a porous material and a second denser portion made of the same porous material, the second denser portion covers an entire surface of the terminal end of the first portion of said anode, wherein said second denser portion is formed integrally on said entire surface of the terminal end of the first portion of said anode, wherein the terminal end of the first portion of the anode is perpendicular to a portion of the anode contacting the electrolyte.

2. A solid oxide fuel cell comprising an electrolyte electrode assembly and a pair of separators sandwiching said electrolyte electrode assembly, said electrolyte electrode assembly including an anode, a cathode, and an electrolyte interposed between said anode and said cathode, wherein a fuel gas is supplied outwardly from a central region to a terminal end of said anode, and an oxygen-containing gas is supplied to said cathode;

an exhaust gas including fuel gas and oxygen-containing gas after reaction is discharged outwardly from said electrolyte electrode assembly;

said anode has a first porosity portion extending along an entire surface of the terminal end and a second porosity portion at the remainder of the anode, the terminal end of the first portion of the anode is perpendicular to a portion of the anode contacting the electrolyte, the first porosity portion and the second porosity portion are made of the same porous material, wherein the first porosity is lower than the second porosity.

3. A fuel cell according to claim 1, wherein said separator includes first and second plates stacked together; and a fuel gas channel for supplying a fuel gas to said anode, and an oxygen-containing gas channel for supplying an oxygen-containing gas to said cathode are formed separately between said first and second plates.

4. A fuel cell according to claim 1, wherein said electrolyte electrode assembly has a disk shape, and said oxygen-containing gas is supplied outwardly from a central region to a terminal end of said cathode.

5. A fuel cell according to claim 2, wherein said separator includes first and second plates stacked together; and a fuel gas channel for supplying a fuel gas to said anode, and an oxygen-containing gas channel for supplying an oxygen-containing gas to said cathode are formed separately between said first and second plates.

6. A fuel cell according to claim 2, wherein said electrolyte electrode assembly has a disk shape, and said oxygen-containing gas is supplied outwardly from a central region to a terminal end of said cathode.

* * * * *